Dec. 10, 1940.    R. HILL    2,224,454
INSIDE CONTROL HOOD LATCH
Original Filed Feb. 17, 1939    2 Sheets-Sheet 1
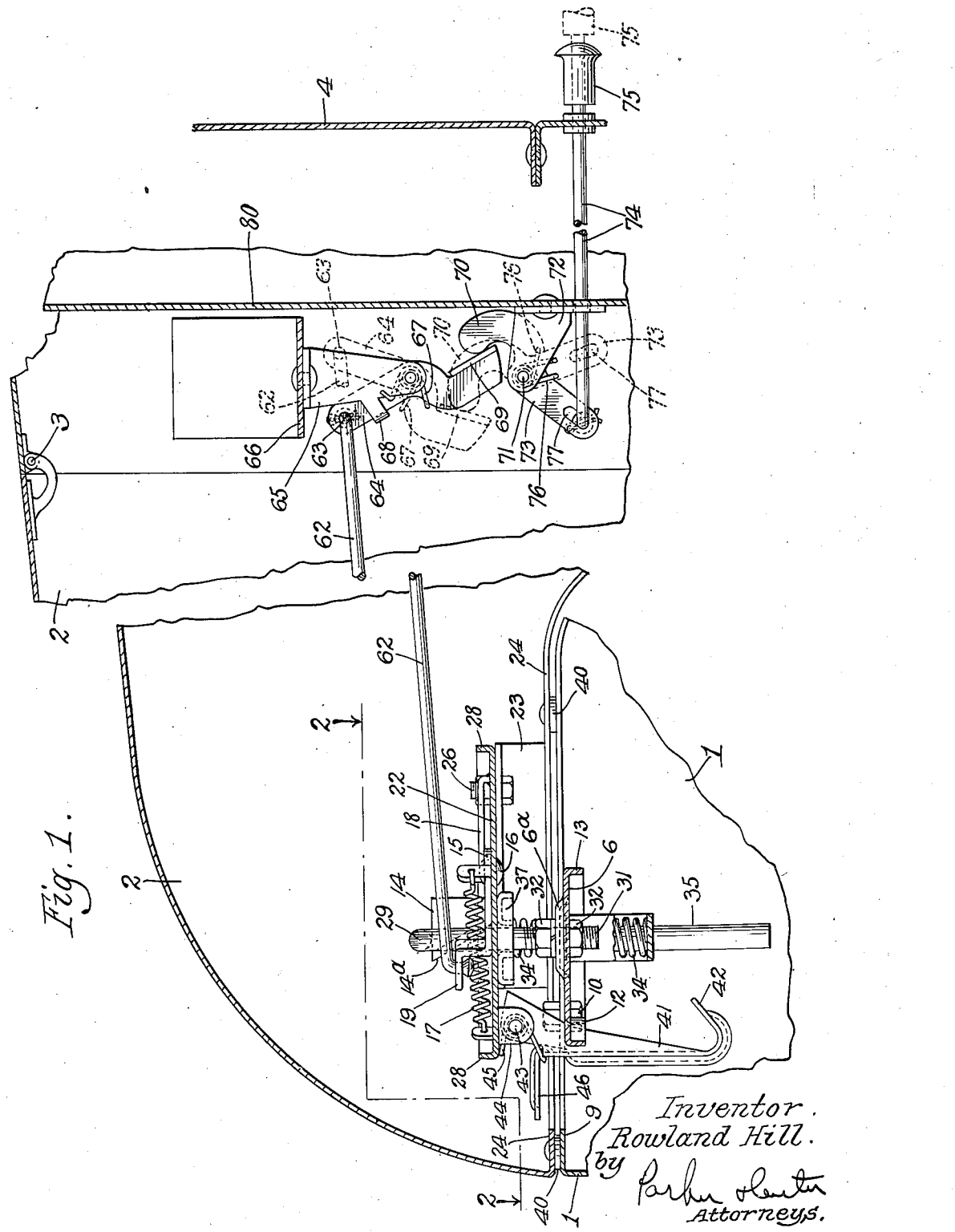

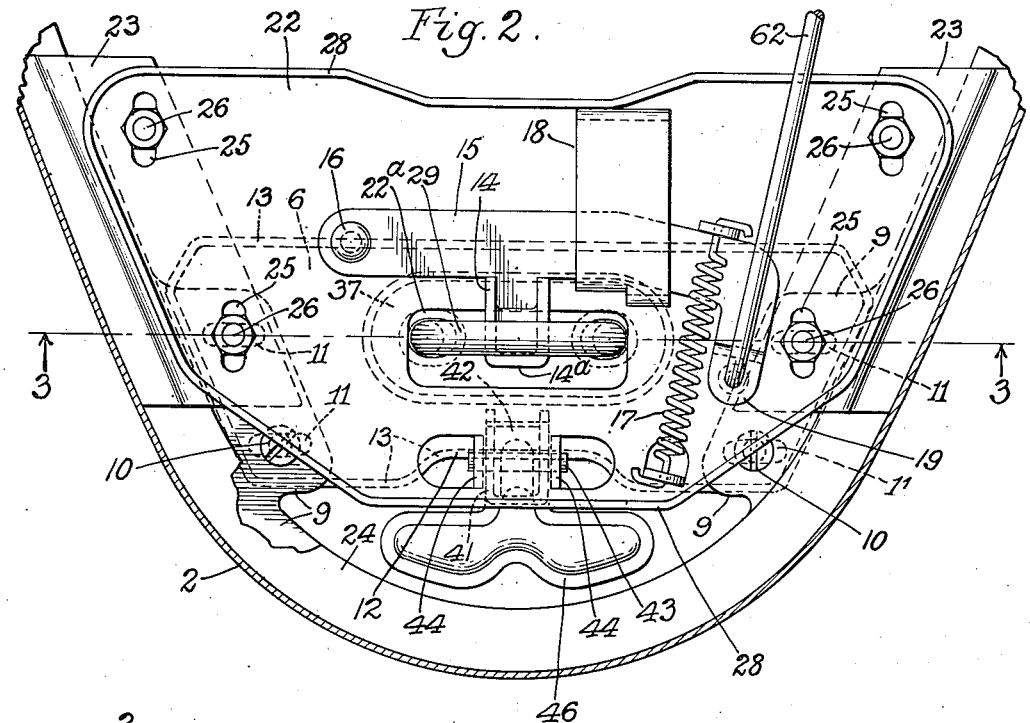
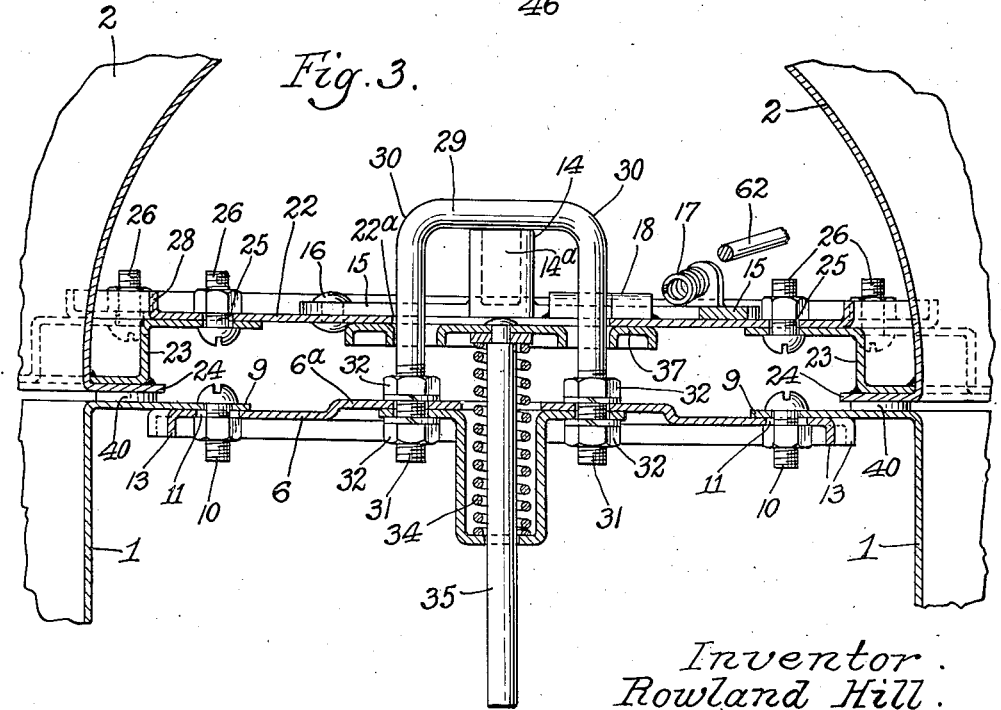

Patented Dec. 10, 1940

2,224,454

UNITED STATES PATENT OFFICE 2,224,454

INSIDE CONTROL HOOD LATCH

Rowland Hill, Chicago, Ill., assignor to Chicago Forging & Manufacturing Company, Chicago, Ill., a corporation of Illinois Original application February 17, 1939, Serial No. 256,965. Divided and this application August 4, 1939, Serial No. 288,263

6 Claims. (Cl. 292—221)

My invention relates to an improvement in latches and has for one purpose the provision of an improved latch for the closure of an automobile hood.

Another purpose is the provision of a latch which may be controlled from the interior of the vehicle, and in particular, which, although the latch proper or movable portion thereof is mounted on and movable with the hood, an actuating control is maintained, which is effective when the hood is in closed position, and which does not interfere with the raising or lowering of the hood.

Other purposes will appear from time to time in the course of the specification and claims.

I illustrate my invention more or less diagrammatically in the accompanying drawings wherein:

Fig. 1 is a longitudinal vertical section;
Fig. 2 is a section on the line 2—2 of Fig. 1; and
Fig. 3 is a section on the line 3—3 of Fig. 2.

Like parts are indicated by like symbols throughout the specification and drawings.

This application is a division of my co-pending application Serial No. 256,965 filed February 17, 1939.

Referring to the drawings, 1 generally indicates the normally fixed portion of an automobile hood or motor housing. 2 indicates a movable hood or hood closure therefor, which may be transversely and horizontally hinged at its rear end in any suitable manner, as for example at 3. It will be understood that the hinge shown is diagrammatic and that any suitable mounting for the rear end of the hood 2 may be employed. 4 generally indicates the instrument panel of the vehicle.

Mounted on the fixed portion of the vehicle, on or within the member 1, is a bottom plate generally indicated at 6. It may be mounted, for example, by bolts or other securing means 10. It is illustrated as having an upwardly extending combined keeper and guiding mechanism 29, shown as U-shaped or stirrup-like, and having rounded guiding corners 30, being held in position, for example, by locking nuts 32 on the screw-ended end portions 31, which are shown as passing through an offset 6a of the plate 6. The plate 6 is preferably mounted on the inwardly turned flange 9 of the fixed member 1, for lateral adjustment in suitable adjusting slots, being shown, for example, at 11, to receive the bolts 10.

12 indicates any suitable securing lip provided with a downwardly turned flange 13 adapted to receive the secondary or safety latching member below described. It will be further understood that, if desired, the flange 13 may extend entirely or substantially around the plate 6 and may serve as a reinforcing or stiffening element therefor.

22 indicates a transversely extending plate mounted on the hood or closure 2, for example upon intermediate brackets 23, secured upon the inturned lower edges or flanges 24 of the hood closure 2. It will be understood that any suitable securing or supporting means may be employed. I illustrate the member 22 as mounted for longitudinal adjustment, and for that purpose I provide adjusting slots 25, through which pass any suitable securing bolts 26, whereby the member 22 is secured upon the upper inner flanges of the brackets 23. The transversely extending member 22 may be provided with a circumferentially extending reinforcing flange 28. The member 22 is shown as having a transversely elongated aperture 22a, through which the yoke or guiding stirrup 29 may upwardly extend.

Mounted on the upper side of the plate 22 I illustrate a latch member 14, shown as formed of sheet metal and mounted on or forming part of a lever 15, pivoted as at 16 for rotation about a vertical pivot, and urged by a spring 17 toward latching position. 18 is any suitable retaining member for the lever 15, which may be secured to the top of the plate 22. 19 is a lug projecting from the end of the lever 15, which is adapted to receive any suitable operating element or rod 62, which terminates as at 63 in a transversely extending portion pivoted in or secured to the below described lever 64, located forwardly of the partition 80.

Any suitable pads or cushioning members of rubber or the like, as shown at 40, may be employed for cushioning the contact between the opposed portions of the housing 1 and the hood 2.

I provide a secondary or safety latching means, which includes a lever or hook 41, with a latching or hook portion proper 42. The hook member is pivoted as at 43 between ears 44, which may be downwardly struck from the upper transverse plate 22. Any suitable means may be employed for urging the hook 42 normally into vertical alignment with the securing lip 12. I illustrate, for example, a coil spring 45. The hook is also provided with a finger or handle piece 46, preferably formed integrally therewith, the purpose of which will later appear.

Referring further to the member 62, it is secured at its rear end as at 63 to a lever 64, pivoted on a bracket 65 or any other suitable transverse support 66, secured to or within the hood 2. A spring 67 serves to bias it to engagement with an abutment 68 associated with the bracket 65. A lower arm of the lever is provided with a contact portion or plate 69 opposed to the U-shaped lever 70, which is pivoted as at 71 on a bracket 72, mounted on the partition or cowl 80 of the vehicle. 73 is an additional arm of the lever which has secured to it the actuating rod 74, which terminates at the operating handle 75 located adjacent the instrument panel 4. 76 is any suitable spring for biasing the U-shaped member 70 into contact with the member 69. The connection between the arm 73 and the rod 74 may include a slot 77.

It will be understood that in the operation of the device, when the hood 2 is in closed position, the parts are in the position in which they are shown in full line in Fig. 1. The operator, by pulling inwardly on the handle 75, can withdraw the latch 15 from latching position through the action of the levers 64 and 70, as illustrated in dotted line, and the consequent endwise movement of the rod 62 toward the rear of the vehicle. However, this lever connection permits the hood 2 to be raised and lowered without interference, and it resumes its ready position when the closure 2 is fully lowered and re-locked.

It will be realized that whereas I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of my invention are as follows:

I provide a compact unitary structure for carrying a lock or a latch, which holds the hood 2 in final locked position, and an additional latch 41, which permits a limited upward movement of the hood 2. I may employ a spring 34 which, through the pin 35 and the plate 37, tends yieldingly to lift the hood 2 toward the upward limit of movement permitted by the hook portion 42 of the latch 41. Normally it need not raise the closure to the full limit of the latch 41, but if the hood 2 happens to be blown open during the movement of the vehicle, the hook 42 positively limits its upward movement.

The main latch 14 cannot be actuated from the exterior of the hood except by the actuation of the operating handle 75 inside the vehicle itself. Assume that the operator wishes to give a filling station attendant access to the engine, he may pull on or otherwise actuate the handle 75, with the result that the latch 14 is withdrawn to released position. The spring 34 may then lift the hood 2 a distance which cannot exceed the full length of the hook member 41, 42. The lift is in practise sufficient to permit the operator to insert his fingers under the forward end of the hood 2 in order to complete the lifting of the closure. The member 46 is conveniently located and shaped to receive the hand or fingers of the operator, so that the operator, by a single unitary upward lift, moves the hook 42 to release position and lifts the closure to any desired height. It will be understood that any suitable means may be employed, not herein shown, for holding the hood 2 in upward position when it has been lifted.

In the operation of the device, the yoke or stirrup 29 serves the unitary purpose of guiding the hood 2 into proper position in relation to the housing 1. For initial adjustment the plate 6 may be laterally adjusted and the plate 22 may be longitudinally adjusted. The rounded corners of the yoke 29 serve as centering means for centering the hood 2 in proper position when it is downwardly moved. There is a slight transverse clearance between the yoke 29 and the inner faces of the apertures 22a. There is, however, a substantial longitudinal clearance to permit tilting of the hood 2. The upper end of the yoke 29 further serves as a keeper to receive the face 14a of the member 14. In practise it can be straight, but a slight inclination is helpful. The inclined face 14a permits the yoke 29 to override the latch 14 against the action of the spring 17. As soon as the yoke clears the bottom of the latch 14, the spring 17 is effective to move it into latching position.

Normally the closure 2 is thus firmly locked. There is always, however, a possibility that the operator may not move the closure down quite far enough to obtain a complete locking effect. In this event, the latch hook 42 is effective, since the spring 45 keeps it at all times in vertical alignment with that portion of the flange 13 which extends along the locking lip 12 of the plate 6. Thus, even if the hood closure 2 is lifted by the wind caused by movement of the car, it can only be lifted through an arc sufficient to cause the hook 42 to engage the flange 13 and further unintended upward movement of the hood closure 2 is thus prevented.

The spring plunger, including the member 45, is effective to keep the parts in a rattle-preventing relationship when locked, and is also effective to raise the hood slightly when the latching means is released. Any further lifting is, of course, prevented by the safety latch 42.

I claim:

1. In combination with a vehicle and a movable hood closure therefor, a lever mounted on the vehicle, means located within the vehicle for actuating said lever, a lever mounted on the movable hood closure and positioned to be opposed to said first mentioned lever when the hood closure is closed, a latch mounted on the movable hood closure, and an actuating connection between said latch and said last mentioned lever.

2. In combination with a vehicle and a movable hood closure therefor, mounted for rotation about a transverse generally horizontal axis located adjacent the rear of the hood closure, an actuating member mounted on the vehicle, operating means located within the vehicle for moving said actuating member, an additional actuating member mounted on and movable with the movable hood closure and positioned to be opposed to the first mentioned actuating member when the hood closure is closed, said actuating members being opposed to each other in operative relationship when the closure is closed, and being removed from each other when the closure is open, a latch mounted on the movable hood closure located adjacent the front end of the closure, and an actuating connection between said latch and said last mentioned actuating member, and means for normally holding said latch in closed position and for at the same time holding said operating means within the vehicle in inoperative position.

3. In combination with a vehicle and a movable hood closure therefor, mounted for rotation about a transverse generally horizontal axis located adjacent the rear of the hood closure, a lever mounted on the vehicle, operating means located within the vehicle for actuating said lever, a lever mounted on the movable hood closure and positioned to be opposed to said first mentioned lever when the hood closure is closed, said actuating members being opposed to each other in operative relationship when the closure is closed, and being removed from each other when the closure is open, a latch mounted on the movable hood closure located adjacent the front end of the closure, and an actuating connection between said latch and said last mentioned lever, said levers being out of cooperative relationship when the hood closure is open, and means for normally holding said latch in closed position and for at the same time holding said operating means within the vehicle in inoperative position.

4. In combination with a vehicle and a movable hood closure therefor, mounted for rotation about a transverse generally horizontal axis located adjacent the rear of the hood closure, an actuating member mounted on the vehicle, operating means located within the vehicle for moving said actuating member, an additional actuating member mounted on and movable with the movable hood closure and positioned to be opposed to the first mentioned actuating member when the hood closure is closed, said actuating members being opposed to each other in operative relationship when the closure is closed, and being removed from each other when the closure is open, a latch mounted on the movable hood closure located adjacent the front end of the closure, and an actuating connection between said latch and said last mentioned actuating member, said actuating members being out of cooperative relationship when said hood closure is open, and means for normally holding said latch in closed position and for at the same time holding said operating means within the vehicle in inoperative position.

5. In combination with a vehicle and a movable hood closure mounted on said vehicle for rotation about a generally horizontal transverse axis, an actuating member mounted on said vehicle, operating means located within said vehicle for moving said actuating member, an additional actuating member mounted on and movable with the movable hood closure and positioned to be opposed to said first mentioned actuating member only when the hood closure is closed, a latch mounted on the movable hood closure, and an actuating connection between said latch and said last mentioned actuating member.

6. In combination with a vehicle and a movable hood closure mounted on said vehicle, a latch mounted on and movable with said hood closure, a manually operable handle mounted on said vehicle and located within said vehicle, and a discontinuous actuating connection between said handle and said latch, said actuating connection being effective only when said hood closure is closed, and yielding means for normally holding said latch in closed position and for at the same time holding said manually operable handle in inoperative position.

ROWLAND HILL.